US009693173B2

(12) United States Patent
Vannithamby et al.

(10) Patent No.: US 9,693,173 B2
(45) Date of Patent: Jun. 27, 2017

(54) GENERATING, BROADCASTING AND RECEIVING SYSTEM INFORMATION BLOCKS

(71) Applicant: Intel Corporation, Santa Clara, CA (US)

(72) Inventors: Rath Vannithamby, Portland, OR (US); Satish C. Jha, Hillsboro, OR (US); Maruti Gupta, Portland, OR (US); Mohammad Mamunur Rashid, Hillsboro, OR (US); Kathiravetpillai Sivanesan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 215 days.

(21) Appl. No.: 14/578,171

(22) Filed: Dec. 19, 2014

(65) Prior Publication Data
US 2016/0073326 A1 Mar. 10, 2016

Related U.S. Application Data

(60) Provisional application No. 62/046,588, filed on Sep. 5, 2014.

(51) Int. Cl.
H04W 4/00 (2009.01)
H04W 48/12 (2009.01)

(52) U.S. Cl.
CPC ........... H04W 4/005 (2013.01); H04W 48/12 (2013.01)

(58) Field of Classification Search
CPC ............................... H04W 4/005; H04W 4/00
See application file for complete search history.

(56) References Cited

U.S. PATENT DOCUMENTS

2012/0220329 A1   8/2012  Kitazoe et al.
2012/0289286 A1* 11/2012 Miki ............... H04W 48/12
                                              455/552.1
2013/0109394 A1*  5/2013  Rangaiah .......... H04W 36/0061
                                              455/437
2014/0092823 A1   4/2014  Song et al.
2014/0198726 A1*  7/2014  Xu ..................... H04W 24/02
                                              370/328

(Continued)

FOREIGN PATENT DOCUMENTS

EP       2 493 223        8/2012
WO    WO 2013/002562      1/2013
WO    WO 2014/046462      3/2014

OTHER PUBLICATIONS

International Search Report and Written Opinion of the International Searching Authority dated Nov. 11, 2015, in International Patent Application No. PCT/US2015/043482, 14 pages.

(Continued)

Primary Examiner — Ricky Ngo
Assistant Examiner — Lan Huong Truong
(74) Attorney, Agent, or Firm — Schwabe, Williamson & Wyatt, P.C.

(57) ABSTRACT

Methods and apparatuses for communicating in a wireless network include receiving full and differential System Information Blocks (SIBs) and updating a parameter that has changed based on the differential SIB. Further apparatuses include control circuitry to generate a first SIB and second SIB, the second SIB indicating information that has changed. Further, a method includes generating a full SIB and generating a differential SIB based on updated parameters.

19 Claims, 9 Drawing Sheets

(56) References Cited

U.S. PATENT DOCUMENTS

| | | | |
|---|---|---|---|
| 2014/0233530 A1* | 8/2014 | Damnjanovic | H04W 48/12 370/331 |
| 2014/0269566 A1* | 9/2014 | Wang | H04W 4/06 370/329 |
| 2014/0302856 A1* | 10/2014 | Nory | H04W 48/10 455/437 |
| 2014/0313999 A1* | 10/2014 | Xu | H04W 72/042 370/329 |
| 2015/0016312 A1* | 1/2015 | Li | H04W 74/0833 370/280 |
| 2015/0208327 A1* | 7/2015 | Baratam | H04W 68/00 455/432.1 |
| 2015/0365880 A1 | 12/2015 | Malladi et al. | |

OTHER PUBLICATIONS

3GPP TS 36.304 V12.1.0 (Jun. 2014); "Technical Specification Group Radio Access Network; Evolved Universal Terrestrial Radio Access (E-UTRA); User Equipment (UE) procedures in idle mode (Release 12)," 35 pages.

3GPP TS 36.321 V11.5.0 (Mar. 2014); "Technical Specification Group Radio Access Network; Evolved Universal Terrestrial Radio Access (E-UTRA); Medium Access Control (MAC) protocol specification (Release 11)," 57 pages.

3GPP TS 36.331 V11.8.0 (Jun. 2014); "Technical Specification Group Radio Access Network; Evolved Universal Terrestrial Radio Access (E-UTRA); Radio Resource Control (RRC); Protocol specification (Release 11)," 354 pages.

\* cited by examiner

SystemInformation message

```
-- ASN1START

SystemInformation ::=          SEQUENCE {
    criticalExtensions             CHOICE {
        systemInformation-r8          SystemInformation-r8-IEs,
        criticalExtensionsFuture      SEQUENCE {}
    }
}
SystemInformation-r8-IEs ::=   SEQUENCE {
    sib-TypeAndInfo                SEQUENCE (SIZE (1..maxSIB)) OF CHOICE {
        sib2                          SystemInformationBlockType2,
        sib3                          SystemInformationBlockType3,
        sib4                          SystemInformationBlockType4,
        sib5                          SystemInformationBlockType5,
        sib6                          SystemInformationBlockType6,
        sib7                          SystemInformationBlockType7,
        sib8                          SystemInformationBlockType8,
        sib9                          SystemInformationBlockType9,
        sib10                         SystemInformationBlockType10,
        sib11                         SystemInformationBlockType11,
        ...,
        sib12-v920                        SystemInformationBlockType12-r9,
        sib13-v920                        SystemInformationBlockType13-r9,
        sib14-v1130                       SystemInformationBlockType14-r11,
        sib15-v1130                       SystemInformationBlockType15-r11,
        sib16-v1130                       SystemInformationBlockType16-r11,
        sib17-v12                         SystemInformationBlockType17-r12
    },
    nonCriticalExtension           SystemInformation-v8a0-IEs          OPTIONAL
    -- Need OP
}

SystemInformation-v8a0-IEs ::= SEQUENCE {
    lateNonCriticalExtension       OCTET STRING                        OPTIONAL, -- Need OP
    nonCriticalExtension           SEQUENCE {}                         OPTIONAL  -- Need OP
}

-- ASN1STOP
```

Fig. 3

*SystemInformationBlockType1 message*

```
-- ASN1START

SystemInformationBlockType1 ::=      SEQUENCE {
    cellAccessRelatedInfo            SEQUENCE {
        plmn-IdentityList                PLMN-IdentityList,
        trackingAreaCode                 TrackingAreaCode,
        cellIdentity                     CellIdentity,
        cellBarred                       ENUMERATED {barred, notBarred},
        intraFreqReselection             ENUMERATED {allowed, notAllowed},
        csg-Indication                   BOOLEAN,
        csg-Identity                     CSG-Identity          OPTIONAL  -- Need OR
    },
    cellSelectionInfo                SEQUENCE {
        q-RxLevMin                       Q-RxLevMin,
        q-RxLevMinOffset                 INTEGER (1..8)        OPTIONAL  -- Need OP
    },
    p-Max                            P-Max                     OPTIONAL,    -- Need OP
    freqBandIndicator                FreqBandIndicator,
    schedulingInfoList               SchedulingInfoList,
    tdd-Config                       TDD-Config                OPTIONAL, -- Cond TDD
    si-WindowLength                  ENUMERATED {
                                         ms1, ms2, ms5, ms10, ms15, ms20,
                                         ms40},
    systemInfoValueTag               INTEGER (0..31),
    nonCriticalExtension             SystemInformationBlockType1-v890-IEs   OPTIONAL   --
Need OP
}

SystemInformationBlockType1-v890-IEs::=   SEQUENCE {
    lateNonCriticalExtension         OCTET STRING (CONTAINING SystemInformationBlockType1-
v8h0-IEs)       OPTIONAL, -- Need OP
    nonCriticalExtension             SystemInformationBlockType1-v920-IEs   OPTIONAL   --
Need OP
}

-- Late non critical extensions
SystemInformationBlockType1-v8h0-IEs ::=  SEQUENCE {
    multiBandInfoList                MultiBandInfoList         OPTIONAL, -- Need OR
    nonCriticalExtension             SystemInformationBlockType1-v9e0-IEs   OPTIONAL   --
Need OP
}

SystemInformationBlockType1-v9e0-IEs ::= SEQUENCE {
    freqBandIndicator-v9e0           FreqBandIndicator-v9e0    OPTIONAL, -- Cond FBI-max
    multiBandInfoList-v9e0           MultiBandInfoList-v9e0    OPTIONAL, -- Cond mFBI-max
    nonCriticalExtension             SEQUENCE {}               OPTIONAL  -- Need OP
}
-- Regular non critical extensions
SystemInformationBlockType1-v920-IEs ::= SEQUENCE {
    ims-EmergencySupport-r9              ENUMERATED {true}         OPTIONAL, -- Need OR
    cellSelectionInfo-v920           CellSelectionInfo-v920    OPTIONAL, -- Cond RSRQ
    nonCriticalExtension             SystemInformationBlockType1-v1130-IEs OPTIONAL   --
Need OP
}
```

Fig. 4a

```
SystemInformationBlockType1-v1130-IEs ::= SEQUENCE {
    tdd-Config-v1130         TDD-Config-v1130        OPTIONAL,  -- Cond TDD-OR
    cellSelectionInfo-v1130  CellSelectionInfo-v1130 OPTIONAL,  -- Cond WB-RSRQ
nonCriticalExtension         SystemInformationBlockType1-v12-IEs  OPTIONAL -- Need ON
}
SystemInformationBlockType1-v12-IEs ::=  SEQUENCE {
    differentialSIBInfo                DifferentialSIBInfo OPTIONAL,   -- Cond
CoverageConstraint UE-ON nonCriticalExtension      SEQUENCE {}              OPTIONAL -- Need OP
}
DifferentialSIBInfo ::=                  SEQUENCE {
sibchangedinfoAftersystemInfoValueTag    INTEGER (0..31),
}

PLMN-IdentityList ::=       SEQUENCE (SIZE (1..maxPLMN-r11)) OF PLMN-IdentityInfo PLMN-IdentityInfo ::=       SEQUENCE {
    plmn-Identity              PLMN-Identity,
    cellReservedForOperatorUse ENUMERATED {reserved, notReserved}
}

SchedulingInfoList ::= SEQUENCE (SIZE (1..maxSI-Message)) OF SchedulingInfo

SchedulingInfo ::= SEQUENCE {
    si-Periodicity          ENUMERATED {
                               rf8, rf16, rf32, rf64, rf128, rf256, rf512},
    sib-MappingInfo         SIB-MappingInfo
}
SIB-MappingInfo ::= SEQUENCE (SIZE (0..maxSIB-1)) OF SIB-Type SIB-Type ::=               ENUMERATED {
                              sibType3, sibType4, sibType5, sibType6,
                              sibType7, sibType8, sibType9, sibType10,
                              sibType11, sibType12-v920, sibType13-v920,
                              sibType14-v1130, sibType15-v1130,
                              sibType16-v1130, sibType17-v12, spare1, ...}

CellSelectionInfo-v920 ::=    SEQUENCE {
    q-QualMin-r9              Q-QualMin-r9,
    q-QualMinOffset-r9        INTEGER (1..8)           OPTIONAL  -- Need OP
}

CellSelectionInfo-v1130 ::=   SEQUENCE {
    q-QualMinWB-r11           Q-QualMin-r9
}

-- ASN1STOP
```

Fig. 4b

```
SystemInformationBlockType1-v12-IEs ::=   SEQUENCE {
    differentialSIBInfo                    DifferentialSIBInfo OPTIONAL,   -- Cond
CoverageConstraint UE-ON nonCriticalExtension       SEQUENCE {}              OPTIONAL  -- Need OP
}
DifferentialSIBInfo ::=                    SEQUENCE {
sibchangedinfoAftersystemInfoValueTag          INTEGER (0..31),
differentialSystemInfoValueTag                 INTEGER (0..31)      -- Need ON
}

PLMN-IdentityList ::=          SEQUENCE (SIZE (1..maxPLMN-r11)) OF PLMN-IdentityInfo PLMN-IdentityInfo ::=          SEQUENCE {
    plmn-Identity                 PLMN-Identity,
    cellReservedForOperatorUse        ENUMERATED {reserved, notReserved}
}

SchedulingInfoList ::= SEQUENCE (SIZE (1..maxSI-Message)) OF SchedulingInfo

SchedulingInfo ::= SEQUENCE {
    si-Periodicity            ENUMERATED {
                                 rf8, rf16, rf32, rf64, rf128, rf256, rf512},
    sib-MappingInfo           SIB-MappingInfo
}

SIB-MappingInfo ::= SEQUENCE (SIZE (0..maxSIB-1)) OF SIB-Type

SIB-Type ::=              ENUMERATED {
                              sibType3, sibType4, sibType5, sibType6,
                              sibType7, sibType8, sibType9, sibType10,
                              sibType11, sibType12-v920, sibType13-v920,
                              sibType14-v1130, sibType15-v1130,
                              sibType16-v1130, sibType16-v12, spare1, ...}

CellSelectionInfo-v920 ::=      SEQUENCE {
    q-QualMin-r9              Q-QualMin-r9,
    q-QualMinOffset-r9        INTEGER (1..8)              OPTIONAL  -- Need OP
}

CellSelectionInfo-v1130 ::=     SEQUENCE {
    q-QualMinWB-r11           Q-QualMin-r9
}

-- ASN1STOP
```

Fig. 4c

GENERATING, BROADCASTING AND RECEIVING SYSTEM INFORMATION BLOCKS

BACKGROUND OF THE INVENTION

Implementations of the claimed invention generally may relate to the field of wireless communications.

BRIEF DESCRIPTION OF THE DRAWINGS

Aspects, features and advantages of embodiments of the present invention will become apparent from the following description of the invention in reference to the appended drawings in which like numerals denote like elements and in which:

FIG. 3 shows an example of a system information message according to some embodiments;

FIGS. 4a and 4b show an example of a system information block type 1 message according to some embodiments. 4c shows an alternative to FIG. 4b according to some embodiments.

DETAILED DESCRIPTION OF THE INVENTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

Figure 1:
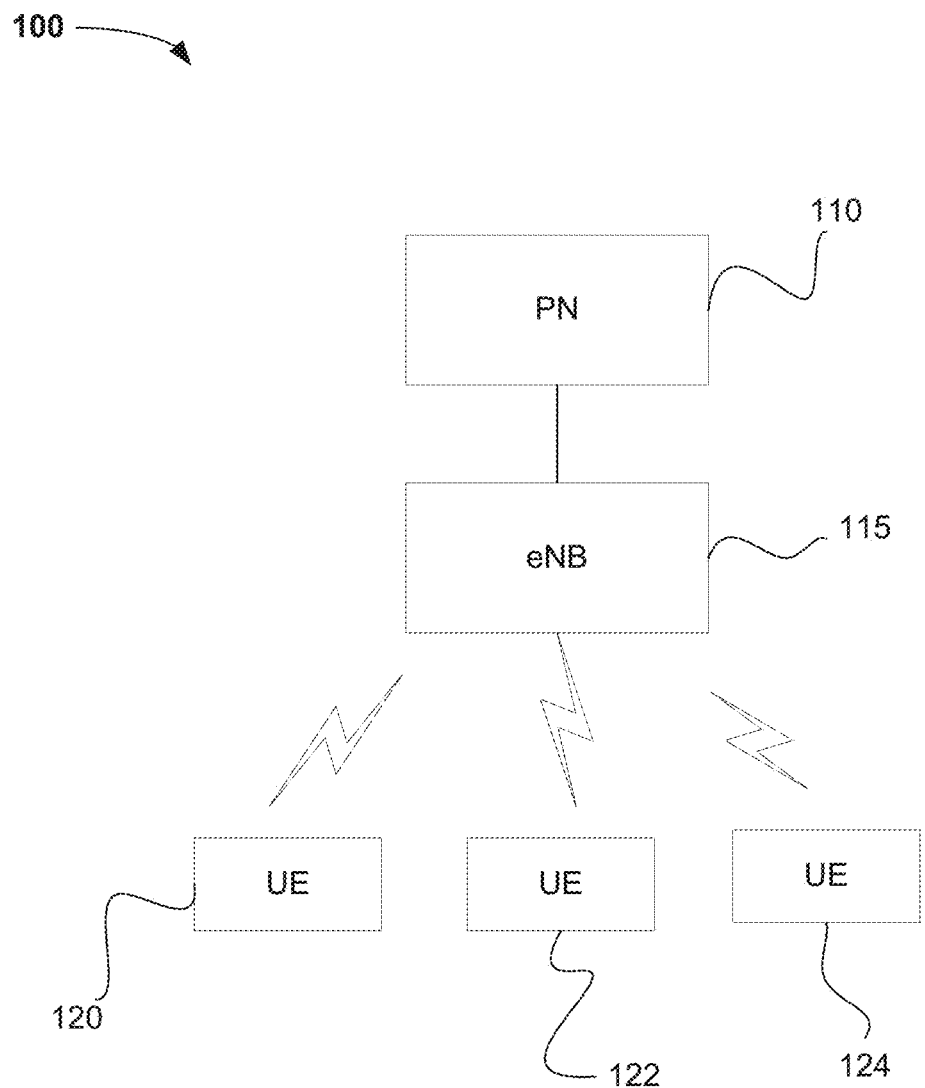
FIG. 1 is block diagram of an example wireless network according to various embodiments.

FIG. 1 illustrates an example wireless communication network 100 according to various embodiments. The network of FIG. 1 may be any wireless system capable of facilitating wireless access between a provider network (PN) 110 and one or more user stations 120-124 including mobile or fixed subscribers. For example in one embodiment, network 100 may be a wireless communication network such as those contemplated by a $3^{rd}$ Generation Partnership Project (3GPP) Long Term Evolution (LTE) mobile phone network and its evolution LTE-Advanced, an Institute for Electrical and Electronics Engineers (IEEE) 802.16 mobile broadband wireless access (BWA) network, an IEEE 802.11 WLAN, or other type of network to which the principles of the inventive embodiments could be suitably applied. Accordingly, terms utilized in the embodiments described below are not limiting to any particular network except as denoted in the appended claims.

In various embodiments, as illustrated, a wireless communication network 100 may include user equipment (UE) 120-124 and an evolved Node B (eNB) 115. In various embodiments, the eNB 115 may be a fixed station (e.g., a fixed node) or a mobile station/node.

In various embodiments, the UE 120-124 and/or the eNB 115 may include a plurality of antennas to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing. The UE 120-124 may provide some type of channel state information (CSI) feedback to the eNB 115 via one or more up link channels, and the eNB 115 may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

Low-cost MTC (LC-MTC) devices and some of the normal UEs (collectively known as coverage constrained UEs) are expected to have physical layer limitations and need coverage enhancement of up to 20 dB in the uplink as well as downlink. To address these limitations and the coverage enhancement needs, a significant amount of changes are necessary in the current LTE air interface. Although many of these potential changes are discussed in the 3GPP, it has also become apparent that such changes to the air interface have a significant impact on the performance of regular UEs if they are to be supported in the same physical cell as coverage constrained UEs.

Therefore, many of the changes that would optimally meet the requirements of coverage constrained UEs have to be overlooked because they might be very detrimental to the performance of regular UEs. On the other hand, meeting some very basic requirements of LC-MTC UEs (coverage constrained UEs) is not possible without potentially major implications to the performance of regular UEs. Overall, in order to support the required coverage for the coverage constrained UEs, one of the mechanisms that would result in changes in standard is using signal repetition. Signal repetition involves using a very high number of repetitions of same copy of broadcast messages (such as System Information messages and paging) in order to ensure reception by a coverage constrained UE. Similarly, a message may need to be transmitted many times by a coverage constrained UE before it may be received by the eNB.

Some of the most important information that the device (UE) needs to receive are the system information blocks (SIBs), which can be large. SIBs may be sent using low order modulations since they are broadcast messages; furthermore, a large number of repetitions (as high as 100 repetitions) may be needed in order to support LC-MTC devices (coverage constrained UEs) with the required coverage enhancement.

Broadcasting a large number of bits with low order modulation with a large number of repetitions is not resource efficient, and may have implications for the performance of regular UEs.

According to some embodiments, the SIB size for coverage constrained UEs is shortened (e.g. to be as small as possible). Embodiments herein introduce "differential information broadcast" of SIBs instead of full SIB broadcast for coverage constrained UEs, so that repetition of such a differential information broadcast does not incur a lot of resource wastage.

In order to support LC-MTC devices or coverage constrained UEs with low coverage, a large number of bits may need to be broadcast with low order modulation and with a large number of repetitions; this is not resource efficient. According to some embodiments, the SIB size is shortened to be as small as possible. Embodiments introduce "differential information broadcast" of SIBs instead of full SIB broadcast for coverage constrained UEs, so that repetition of such differential information broadcast does not incur a lot of resource wastage.

Figure 2A:
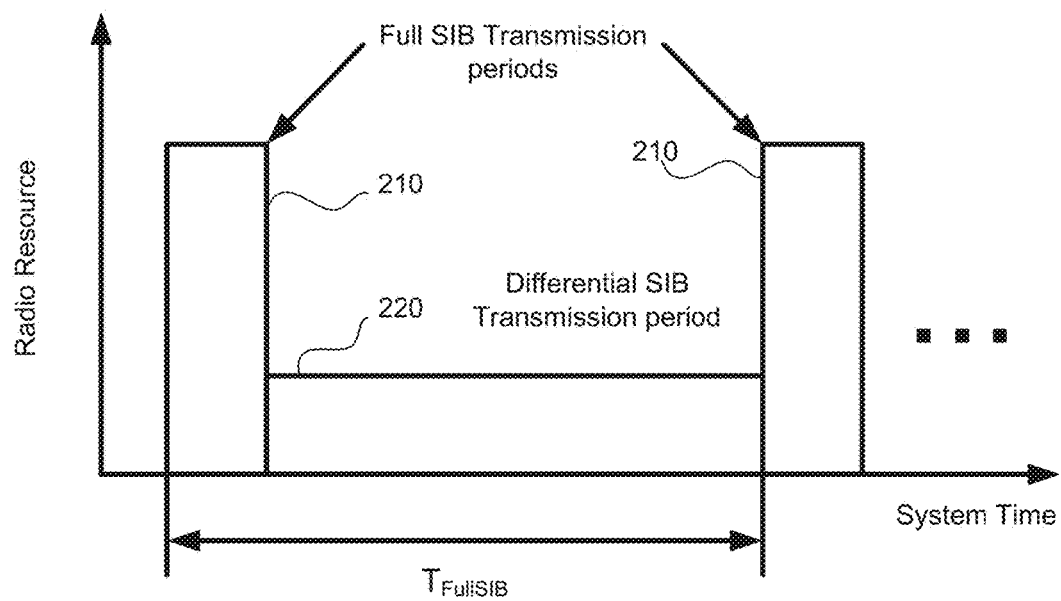
FIG. 2a illustrates radio resource usage according to some embodiments.
Figure 2B:
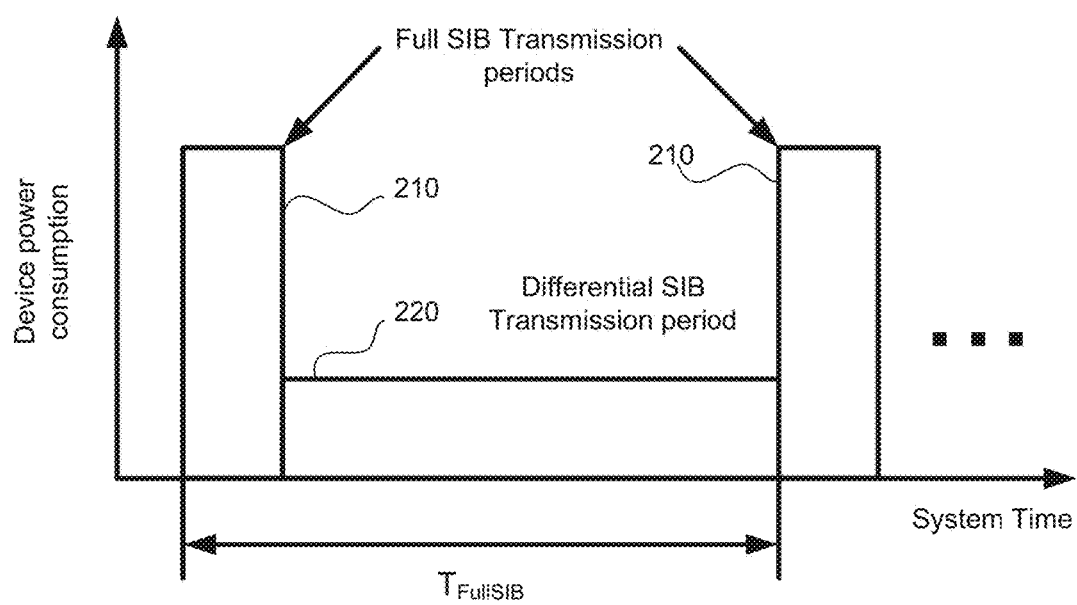
FIG. 2b illustrates device power consumption according to some embodiments.

According to this arrangement, since differential SIBs are broadcasted most of the time, the resulting resource utilization and device power efficiency would be more efficient compared with an arrangement in which a large number of bits are to be broadcasted with low order modulation with a large number of repetitions. FIG. 2a illustrates radio resource usage with time. FIG. 2b illustrates device power consumption (e.g. by a UE) associated with SIB communication (e.g. receiving SIBs). During full SIB transmission periods 210 (when full SIBs are transmitted), radio resource usage for SIB transmission is greater (per unit time) than during a differential SIB transmission period 220 (when differential SIBs are transmitted).

The idea of differential SIB broadcast and the proposed schemes according to some embodiments can be described as follows:

The regular SIBs are repeated a required number of times for coverage constrained UEs. The repetition may be periodic with a longer period called TFullSIB such as every 30 min, 1 hour, or several hours, for example.
The value of TFullSIB can be determined by the latency tolerance of coverage constrained UEs.
The locations of Full SIBs repetitions can be predefined and known to coverage constrained UEs.
Alternately, full SIBs repetitions time information can also be broadcasted in the SIB1.
In some embodiments, eNB may configure support for Enhanced coverage Mode during specific time intervals only. In case of Enhanced coverage mode time periods are defined, then the full SIB transmissions may be configured to take place only at the beginning of when this mode is triggered, or during only some intervals of Enhanced coverage mode and not others.
According to some embodiments, in between full SIBs repetition instants, differential SIBs are repeated. A differential SIB carries only changed information of one or more SIBs that have changed after the previous Full SIBs repetitions.
During this period SIBs may be transmitted for regular UEs as per current specification. However, these SIBs are not repeated. Only differential SIB is repeated for coverage constrained UEs in the differential SIB transmission period.
Newcomer coverage constrained UEs, which have missed the previous Full SIBs repetitions, need to wait for the next Full SIBs repetitions to achieve the updated SIBs.
The UEs, which have received the previous Full SIBs repetitions, read the differential SIBs to update the SIBs if needed (i.e. if UEs see updated systemInfoValueTag).
Some embodiments provide a new SIB type to carry the differential SIB. FIGS. 3 and 4 show examples of proposed modifications in System Information (SI) message and SIB1 message to enable differential SIB. Underlined text indicates the proposed changes.
Differential SIB can be of very small size compared to Full SIBs. Therefore, repetitions of Differential SIB in place of Full SIBs repetitions can save significant amount of radio resources. At the same time, coverage constrained UEs can save device power by receiving smaller broadcast messages (differential SIB) rather than receiving all the required SIBs separately.

FIG. 3 shows an example of a proposed new sib17-v12 which carries the differential SIB content for broadcasting to coverage constraint UEs using signal repetition. According to some embodiments, Sib17-v12 (i.e. differential SIB) will have only the changed parameter values of one or more SIBs contents which have been modified after a known time instant in past. Underlining indicates changes associated with some embodiments.

FIGS. 4 and 4a illustrate a typical example showing change in SIB1 to carry the scheduling and other information about the differential SIB. FIG. 4b is a continuation of the message in FIG. 4a, such that FIGS. 4a and 4b are parts of the same message. sibchangedinfoAfterSystemInfoValueTag shows after what time the differential SIB contains all the changed information. For example, sibchangedinfoAfterSystemInfoValueTag may have the value of systemInfoValueTag of the last SIB to include changed parameters. sibchangedinfoAfterSystemInfoValueTag is always less than or equal to current systemInfoValueTag. Underlining indicates changes associated with some embodiments.

The underlined portions in FIGS. 3 and 4b include "v12", indicating version 12. This is merely exemplary, other version numbers may be used, as appropriate.

Figure 5:
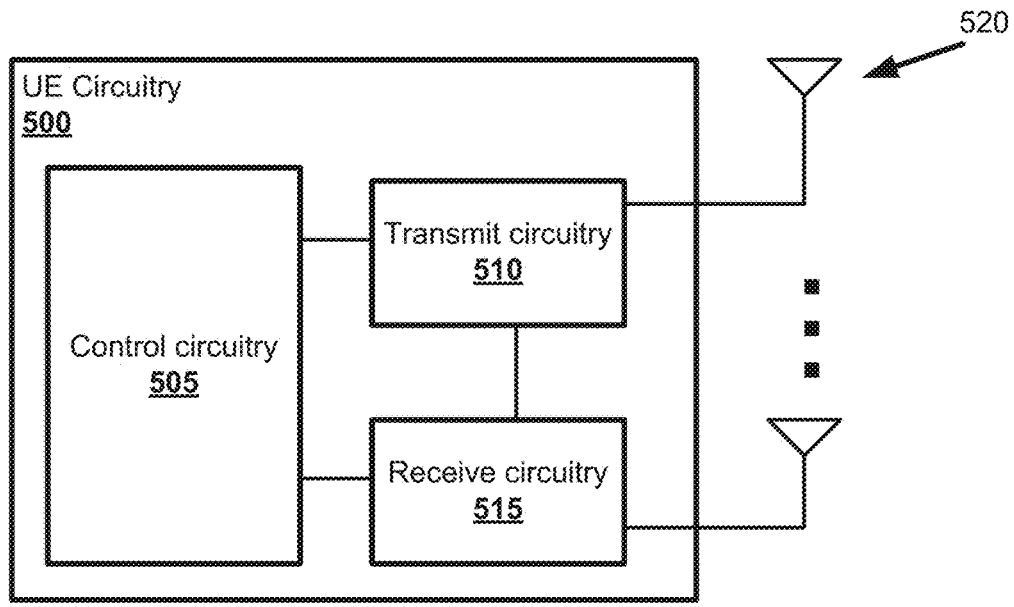
FIG. 5 is a block diagram showing an example User Equipment configured for communicating in a wireless network according to one or more embodiments.

FIG. 5 illustrates UE circuitry 510 in accordance with various embodiments. In embodiments, the UE circuitry may include transmit circuitry 510 and receive circuitry 515 coupled to control circuitry 505. The transmit circuitry 510 and receive circuitry 515 may be coupled to one or more antennas 520 for transmission over the air. The components of the UE circuitry 500 may be configured to perform operations similar to those described elsewhere in this disclosure with respect to a UE. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the UE circuitry 500 may be implemented in, or perform functions associated with one or more software or firmware modules.

Figure 6:
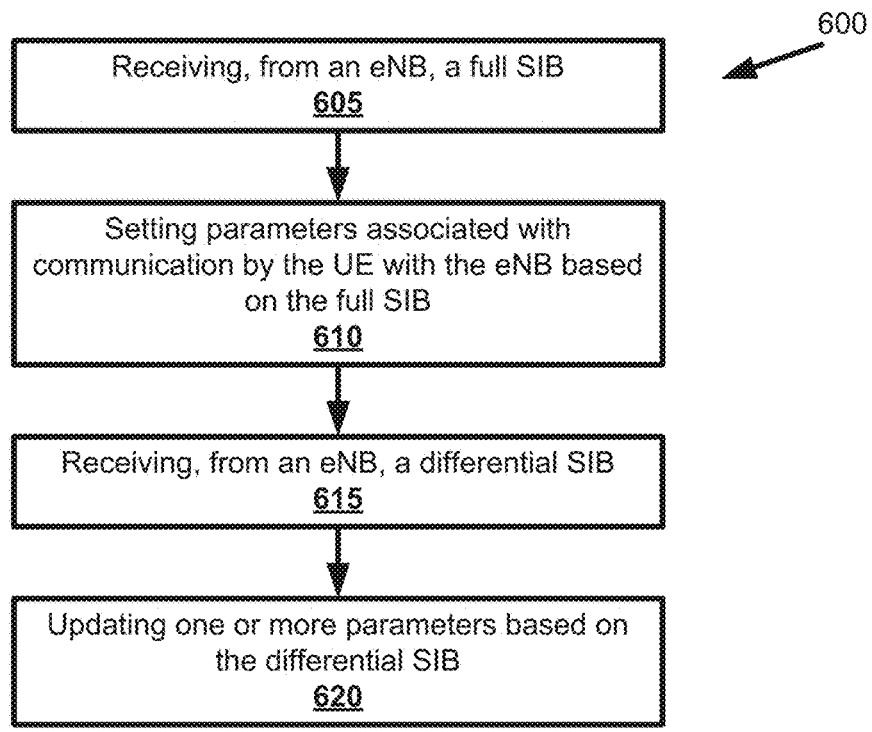
FIG. 6 illustrates a method performed by a User Equipment, according to some embodiments.

In embodiments, the UE circuitry 500 of FIG. 5 may be configured to perform one or more processes, such as the process 600 depicted in FIG. 6. In embodiments, the process may include receiving 605, from an eNB, a full SIB. The full SIB may include a plurality of parameters. The process may further include an operation for setting parameters 610 in the UE based on the full SIB. The parameters may be associated with communication between the UE and the eNB. The process may further include an operation for receiving 615, from the eNB, a differential SIB. The differential SIB may be smaller than the full SIB and may include only those parameters that have changed since the full SIB (for coverage constraints UEs with repetitions of copies) was transmitted by the eNB. The process may further include an operation for updating 620 one or more parameters based on the differential SIB. In embodiments, the UE circuitry 500 may be configured to perform one or more additional or alternative process elements, as described elsewhere in this specification.

Figure 7:
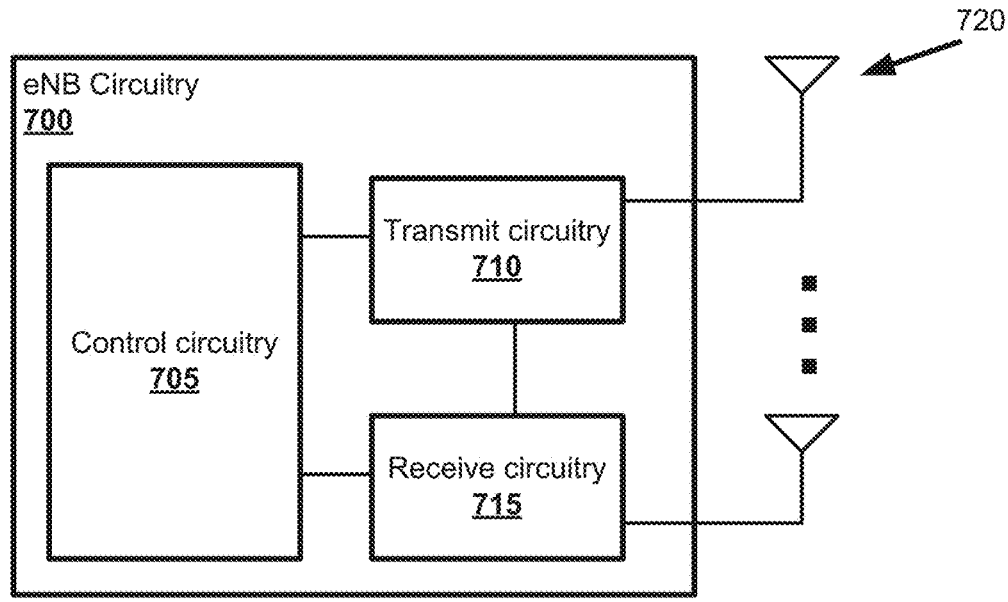
FIG. 7 is a block diagram showing an example eNodeB configured for communicating in a wireless network according to one or more embodiments.

FIG. 7 illustrates eNB circuitry 700 in accordance with various embodiments. In embodiments, the eNB circuitry 700 may include transmit circuitry 710 and receive circuitry 715 coupled to control circuitry 705. The transmit circuitry 710 and receive circuitry 715 may be coupled to one or more antennas 720 for transmission over the air. The components of the eNB circuitry 700 may be configured to perform operations similar to those described elsewhere in this disclosure with respect to an eNB. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the eNB circuitry 700 may be implemented in, or perform functions associated with one or more software or firmware modules.

Figure 8:
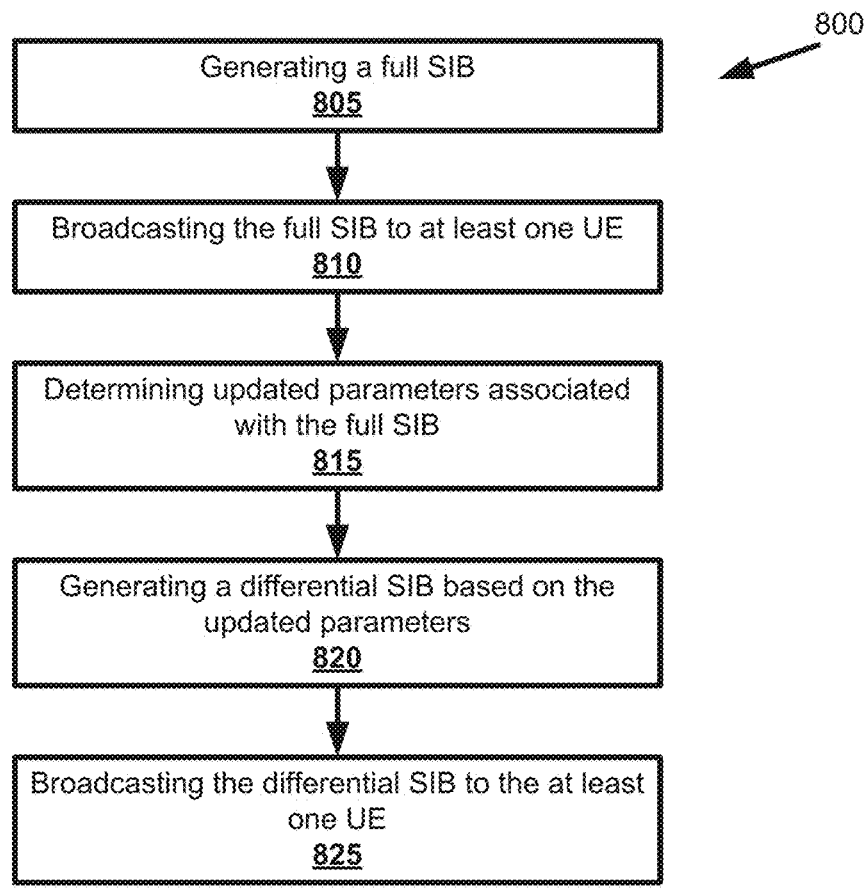
FIG. 8 illustrates a method performed by an eNodeB, according to some embodiments.

In embodiments, the eNB circuitry 700 of FIG. 7 may be configured to perform one or more processes, such as the process 800 depicted in FIG. 8. In embodiments, the process may include generating 805 a full SIB. The full SIB may include a plurality of parameters associated with communication between the eNB and a UE. The process may further include an operation for broadcasting 810 the full SIB to at least one UE. The process may further include an operation for determining updated parameters 815 associated with the full SIB. The updated parameters may be a subset of the parameters associated with the full SIB. The process may further include an operation for generating a differential SIB 820 based on the updated parameters. The differential SIB may be appreciably smaller than the full SIB because the differential SIB may only include a subset (e.g., updated) of parameters of those parameters included in the full SIB. The process may further include an operation for broadcasting 825 the differential SIB to the at least one UE. This broadcasting may be repeated before another full SIB is transmitted for coverage constrained UEs. In embodiments, the eNB circuitry 700 may be configured to perform one or more additional or alternative process elements, as described elsewhere in this specification.

In some embodiments, broadcasting a full SIB includes broadcasting the full SIB a number of times. The full SIB may be identical in each repetition. The repetitions may be completed before broadcasting a different SIB. Broadcasting a differential SIB may include broadcasting the differential SIB a number of times. The differential SIB may be identical in each repetition. The repetitions may be completed before broadcasting a different SIB (e.g. the next distinct SIB).

In some embodiments, full SIBs may be broadcast with a first periodicity ($T_{FullSIB}$). Differential SIBs may be broadcast with a second periodicity that is shorter than the first periodicity. Accordingly, the differential SIBs may be broadcast more frequently than the full SIBs. In some examples the first periodicity may be greater than 30 minutes, or may be greater than 1 hour. Where the SIBs are repeated, the periodicity of full SIBs may be measured between a first repetition of a full SIB and a first repetition of the next distinct full SIB. Similarly, the periodicity of differential SIBs may be measured between a first repetition of a differential SIB and a first repetition of the next distinct differential SIB.

Figure 9:
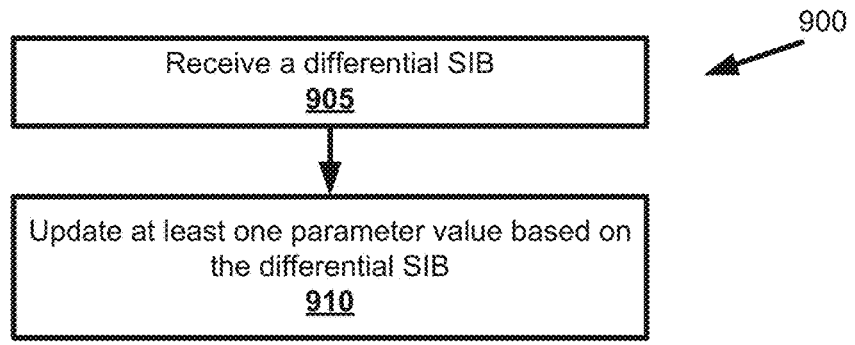
FIG. 9 illustrates a method performed by a User Equipment, according to some embodiments.

FIG. 9 illustrates a method 900 according to some embodiments. The method 900 of FIG. 9 may be performed by a UE, and includes receiving 905 a differential SIB. The differential SIB may indicate parameter values that have changed since a previous SIB was broadcast. The method 900 further includes updating the device performing the method 900 (e.g. a UE) at least one parameter value that has changed, e.g. is indicated to have changed in the differential SIB, based on the received differential SIB.

In some embodiments, the method 900 may include receiving the previous SIB prior to receiving the differential SIB. The previous SIB may be a full SIB, or may be a differential SIB. That is, the differential SIB may indicate changes relative to a previous full SIB or indicate changes relative to a previous differential SIB.

In some examples the previous SIB may be a full SIB. In some embodiments, prior to receiving a full SIB the device performing the method 900 may determine a timing (e.g. scheduling) of the full SIB. The timing of the full SIB may be based on pre-defined timing information known to the UE (e.g. standard timing previously stored in hardware, firmware or software of the device). In some embodiments, the timing may be determined based on information received from an eNB or other network element. For example, the timing may be received in a SIB1 broadcast SIB1 broadcasts may include a systemInfoValueTag parameter. When a UE receives an SIB1 broadcast, it may store the value of systemInfoValueTag included in the broadcast. If the systemInfoValueTag broadcast in a subsequent SIB1 is newer (higher new value) compared to systemInfoValueTag stored in the UE, the UE knows that some system parameters have been updated. Where the UE receives a SIB1 and determines that no parameters have been updated, it is unnecessary for the UE to receive other SIBs.

In some examples, the device may receive one or more SIBs between the previous SIB and the differential SIB received at 905. These one or more SIBs may indicate that no parameters have changed. In some embodiments, a new parameter may be broadcast with the SIB. For example, the parameter may be included in the DifferentialSIBInfo IE. FIG. 4c shows an alternative version of FIG. 4b including parameter 'differentialSystemInfoValueTag' in the DifferentialSIBInfo IE. DifferentialSystemInfoValueTag is similar to 'SystemInfoValueTag'. The parameter sibchangedinfoAftersystemInfoValueTag indicates whether there is change in SI parameters since a last Full SIB transmission, similarly, differentialSystemInfoValueTag indicates whether there are new updated parameters in a differential SIB compared to previous differential SIBs. For example, whenever there is a change in any SI parameters in a differential SIB relative to the previous differential SIB, the value of differentialSystemInfoValueTag is increased by 1. In some embodiments, the value of the differentialSystemInfoValueTag may be reset to zero after each full SIB transmission. The UE may store differentialSystemInfoValueTag and systemInfoValueTag when SIBs are received, and based on the stored values of these Tags (differentialSystemInfoValueTag and systemInfoValueTag) and current values of Tags (sibchangedinfoAftersystemInfoValueTag, differentialSystemInfoValueTag and systemInfoValueTag) in SIB1, a coverage constrained UE may determine whether or not the SIB parameters have changed, and so may determine whether or not it needs to read the upcoming differential SIBs.

According to this arrangement, the SIB broadcast may indicate the version number of current SI (by systemInfoValueTag) in SIB1 and a UE receiving the SIB1 broadcast may decide whether there is change in SI information or not (compared with the information currently stored by the UE). Thus, each UE may have a version number for its stored SI. The UE may check the systemInfoValueTag of a received SIB1, and if it is higher than the value of SystemInfoValueTag stored by the UE, the UE may determine that some parameters have changed. According to some embodiments, UE may not know which parameters have changed, and so the UE may re-acquire all the SIBs needed in the current system.

According to some embodiments, an eNB includes control circuitry to generate a first SIB. The control circuitry may determine that information (e.g. some of the system information) has changed since the first SIB was generated. The control circuitry may generate a second SIB based on the determination, with the second SIB indicating the information that has changed. The second SIB may exclude all or some information that has not changed relative to the first SIB. In some examples, the second SIB indicates only information that has changed since the first SIB.

In some embodiments, the first SIB may always be a full SIB. In some embodiments the first SIB may be a full SIB or a differential SIB.

The first and second SIBs may be broadcast by the eNB; the second SIB may be broadcast subsequent to the broadcast of the first SIB.

In some embodiments, the broadcast of the first SIB is repeated a number of times (e.g. a predetermined number of times) for reception by coverage constrained UEs. The broadcast of the second SIB may also be repeated a number of times. The broadcast of the second SIB may be subsequent to the repeated broadcast of the first SIB. In the repeated broadcasts of the first SIB, the first SIB may be identical in each repetition. Similarly, in the repeated broadcasts of the second SIB, the second SIB may be identical in each repetition.

In some examples, the control circuitry may be arranged to generate a third SIB for UEs that are not coverage constrained. These UEs may not require repeated broadcasts of the SIBs, and so the third SIB may be broadcast without repetition. In some embodiments, the third SIB (and similar SIBs for UEs that are not coverage constrained) does not affect the determination of information that has changed since the broadcast of the first SIB, even when the third SIB is generated between the first and second SIBs.

According to some embodiments differential SIBs may be shorter or smaller than full SIBs. Differential SIBs may have fewer bits than full SIBs. Differential SIBs may require less bandwidth or less time to broadcast than full SIBs.

Figure 10:
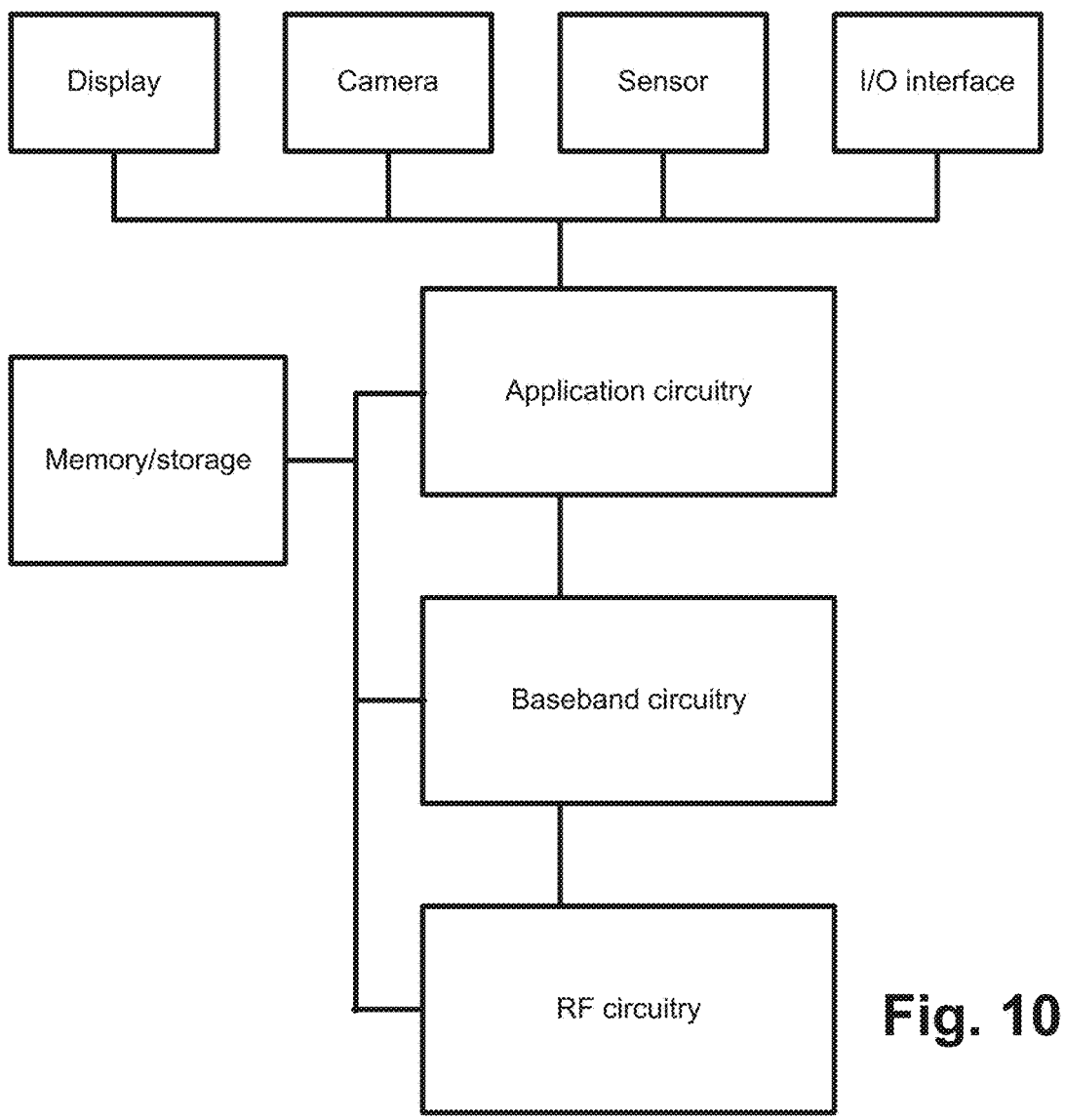
FIG. 10 a system according to some embodiments.

Embodiments described herein may be implemented into a system using any suitably configured hardware and/or software. FIG. 10 illustrates, for one embodiment, an example system comprising radio frequency (RF) circuitry, baseband circuitry, application circuitry, memory/storage, display, camera, sensor, and input/output (I/O) interface, coupled with each other at least as shown.

The application circuitry may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry may include circuitry such as, but not limited to, one or more single-core or multi-core processors. The processor(s) may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, baseband circuitry may include circuitry to operate with signals that are not strictly considered as being in a baseband frequency. For example, in some embodiments, baseband circuitry may include circuitry to operate with signals having an intermediate frequency, which is between a baseband frequency and a radio frequency.

RF circuitry may enable communication with wireless networks using modulated electromagnetic radiation through a non-solid medium. In various embodiments, the RF circuitry may include switches, filters, amplifiers, etc. to facilitate the communication with the wireless network.

In various embodiments, RF circuitry may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmit circuitry, control circuitry, or receive circuitry discussed above with respect to the UE or eNB may be embodied in whole or in part in one or more of the RF circuitry, the baseband circuitry, and/or the application circuitry. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

Memory/storage may be used to load and store data and/or instructions, for example, for system. Memory/storage for one embodiment may include any combination of suitable volatile memory (e.g., dynamic random access memory (DRAM)) and/or non-volatile memory (e.g., Flash memory).

In various embodiments, the I/O interface may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

Where appropriate, methods described herein may be implemented as a computer program. The computer program may be stored on a storage medium, such as a non-transitory storage medium.

EXAMPLES

Example 1 may include a new mechanism of "differential information broadcast" of SIBs in place of full SIB broadcast has been proposed for coverage constrained UEs to minimize the radio resource and device power wastage.

Example 2 may include a mechanism whereby Full SIBs are repeated at pre-defined locations known to the coverage constrained UEs.

Example 3 may include a provision whereby Network can broadcast the time info for next full SIBs repetitions to the coverage constraint UEs.

Example 4 may include a mechanism whereby only differential SIB is repeated in between full SIB repetitions for the coverage constrained UEs.

Example 5 may include a new SIB which carries only the changed parameters values of one or more SIBs that have been modified after a known reference time instant in the past for example last full SIB repetitions.

Example 6 may include modifications in system information message and SIB type 1 message to enable "differential information broadcast" of SIBs.

Example 7 may include a provision whereby coverage constraint UEs can receive updated SIBs parameters by acquiring differential SIB instead of full SIBs.

Example 8 may include an apparatus to be included in an evolved Node B ("eNB"), the apparatus comprising: control circuitry to generate a full system information block ("SIB"), to detect changed information associated with the full SIB, and to generate a differential SIB based on the changed information; and transmit circuitry, coupled with the control circuitry, to transmit the full SIB and to transmit the differential SIB after transmission of the full SIB.

Example 9 may include the apparatus of example 8, wherein the control circuitry is to generate a System Information ("SI") message that includes an indication of the differential SIB, and further wherein the transmit circuitry is to transmit the SI message.

Example 10 may include may include the apparatus of example 8, wherein the control circuitry is to determine an interval at which full SIBs are to be transmitted, and further wherein the transmit circuitry is to transmit the interval.

Example 11 may include the apparatus of example 8, wherein a Type 1 SIB includes an indication of the differential SIB.

Example 12 may include the apparatus of any of examples 8-11, wherein the control circuitry is to cause the transmit circuitry to repeatedly transmit the differential SIB.

Example 13 may include the apparatus of example 12, wherein the control circuitry is to cause the transmit circuitry to repeatedly transmit the differential SIB at predetermined intervals before transmission of another full SIB.

Example 14 may include the apparatus of any of example 8-13, wherein the differential SIBs are to be broadcast to a user equipment ("UE") that is associated with at least one of constrained coverage or low-cost machine-type communication.

Example 15 may include an apparatus to be included in a user equipment ("UE"), the apparatus comprising: receive circuitry to receive, from an evolved Node B ("eNB") a full System Information Block ("SIB") and a differential SIB; and control circuitry, coupled with the receive circuitry, to set parameters associated with communication by the UE with the eNB based on the full SIB and to update at least one of the parameters based on the differential SIB.

Example 16 may include the apparatus of example 15, wherein the receive circuitry is to receive a System Information ("SI") message that includes an indication of the differential SIB, and further wherein the control circuitry is to detect the differential SIB based on the indication.

Example 17 may include the apparatus of example 15, wherein the receive circuitry is to receive an indication of an interval at which full SIBs are to be transmitted by the eNB, and further wherein the control circuitry is to detect full SIBs based on the indicated interval.

Example 18 may include the apparatus of example 15, wherein a Type 1 SIB includes an indication of the differential SIB.

Example 19 may include the apparatus of any of examples 15-18, wherein the receive circuitry is to receive a plurality of repeated differential SIBs.

Example 20 may include the apparatus of example 19, wherein repeated full SIBs are received at predetermined intervals before reception of differential SIBs.

Example 21 may include the apparatus of any of example 15-18, wherein the UE is associated with at least one of constrained coverage or low-cost machine-type communication.

Example 22 may include a method to be performed by an evolved Node B ("eNB"), the method comprising: generating a full system information block ("SIB"); broadcasting the full SIB to at least one user equipment ("UE"); determining updated parameters associated with the full SIB; generating a differential SIB based on the updated parameters; and broadcasting the differential SIB to the at least one UE.

Example 23 may include the method of example 22, further comprising: generating a System Information ("SI") message that includes an indication of the differential SIB; and broadcasting the SI message to the at least one UE.

Example 24 may include the method of example 22, further comprising: determining an interval at which full SIBs are to be broadcast; and transmitting the interval to the at least one UE.

Example 25 may include the method of example 22, wherein a Type 1 SIB includes an indication of the differential SIB.

Example 26 may include the method of any of examples 22-25, further comprising: repeatedly transmitting the differential SIB.

Example 27 may include the method of example 26, wherein repeatedly transmitting the differential SIB comprises: repeatedly transmitting the differential SIB at predetermined intervals before transmitting another full SIB.

Example 28 may include the method of any of example 22-25, wherein the at least one UE is associated with at least one of constrained coverage or low-cost machine-type communication.

Example 29 may include a method to be performed by a user equipment ("UE"), the method comprising: receiving, from an evolved Node B ("eNB") a full System Information Block ("SIB"); setting parameters associated with communication by the UE with the eNB based on the full SIB; receiving a differential SIB; and updating at least one of the parameters based on the differential SIB.

Example 30 may include the method of example 29, further comprising: receiving a System Information ("SI") message that includes an indication of the differential SIB; and detecting the differential SIB based on the indication.

Example 31 may include the method of example 29, further comprising: receiving an indication of an interval at which full SIBs are to be transmitted by the eNB, and detecting full SIBs based on the indicated of the interval.

Example 32 may include the method of example 29, wherein a Type 1 SIB includes an indication of the differential SIB.

Example 33 may include the method of any of examples 29-32, further comprising: receiving a plurality of repeated differential SIBs.

Example 34 may include the method of example 33, wherein the repeated differential SIBs are received at predetermined intervals before receiving another full SIB.

Example 35 may include the method of any of example 29-32, wherein the UE is associated with at least one of constrained coverage or low-cost machine-type communication.

Example 36 may include an apparatus comprising means to perform the method of any of examples 22-28.

Example 37 may include one or more non-transitory computer readable media comprising instructions configured to cause an evolved Node B ("eNB"), upon execution of the instructions by one or more processors of the eNB, to perform the method of any of examples 22-28.

Example 38 may include an apparatus comprising means to perform the method of any of examples 29-35.

Example 39 may include one or more non-transitory computer readable media comprising instructions configured to cause a user equipment ("UE"), upon execution of the instructions by one or more processors of the UE, to perform the method of any of examples 29-35.

Example 40 may include an apparatus comprising means to perform the method of any of examples 36-42.

Example 41 may include a method of communicating in a wireless network as shown and described herein.

Example 42 may include a system for providing wireless communication as shown and described herein.

Example 43 may include a device for providing wireless communication as shown and described herein.

The following clauses illustrate exemplary embodiments.

1. An apparatus for use in a user equipment (UE), the apparatus comprising:
receive circuitry to receive, from an evolved Node B (eNB) a full System Information Block (SIB) and a differential SIB; and
control circuitry, coupled with the receive circuitry, to set parameters associated with communication by the UE with the eNB based on the full SIB and to update at least one of the parameters based on the differential SIB.

2. The apparatus of clause 1, wherein the receive circuitry is to receive a System Information (SI) message that includes an indication of the differential SIB, and further wherein the control circuitry is to detect the differential SIB based on the indication.

3. The apparatus of clause 1 or clause 2, wherein the receive circuitry is to receive an indication of an interval at which full SIBs are to be transmitted by the eNB, and further wherein the control circuitry is to detect full SIBs based on the indicated interval.

4. The apparatus of any one of clauses 1 to 3, wherein a Type 1 SIB includes an indication of the differential SIB.

5. The apparatus of any one of clauses 1 to 4, wherein the receive circuitry is to receive a plurality of repeated differential SIBs.

6. The apparatus of any one of clauses 1 to 5, wherein repeated full SIBs are received at predetermined intervals before reception of differential SIBs.

7. The apparatus of any one of clauses 1 to 6, wherein the UE is associated with at least one of constrained coverage or low-cost machine-type communication.

8. A user equipment comprising the control circuitry of any one of clauses 1 to 7, and further comprising one or more of: a display, a touch screen display, a speaker, a physical keyboard, a keypad, a non-volatile memory port, a universal serial bus (USB) port, or an audio jack.

9. A method of updating parameters in a user equipment (UE), the method comprising:

receiving a differential SIB indicative of parameter values that have changed since a previous SIB; and updating at least one of the parameter values that have changed, based on the received differential SIB.

10. The method of clause 9, wherein the previous SIB is a full SIB, the method further comprising:

determining, prior to receiving the full SIB, a timing of the full SIB, the determining including one of:

using pre-defined timing information known to the UE, or received in a SIB 1 broadcast.

11. The method of clause 9, wherein the previous SIB is a differential SIB.

12. The method of any one of clauses 9 to 11, further comprising:

receiving a SIB 1 broadcast prior to receiving the differential SIB, determining, based on information in the SIB 1 broadcast, whether or not any parameter values have changed since the previous SIB, and performing the receiving the differential SIB and updating at least one parameter in response to a determination that at least one parameter has changed since the previous SIB.

13. The method of clause 12, wherein the SIB 1 broadcast indicates a most recent SIB having changed information, and the determining includes determining whether the previous SIB is more recent than the most recent SIB having changed information.

14. Control circuitry for use in an evolved Node B (eNB), the control circuitry arranged to:

generate a first System Information Block (SIB) including system information;

determine information that has changed since the generating of the first SIB; and generate a second SIB based on the determination, the second SIB indicating the information that has changed and excluding at least some information that has not changed relative to the first SIB.

15. The control circuitry of clause 14, further arranged to:
cause the first SIB to be broadcast; and
cause the second SIB to be broadcast subsequent to the broadcast of the first SIB.

16. The control circuitry of clause 15, wherein:

the causing the first SIB to be broadcast includes repeating the broadcast of the first SIB a plurality of times for reception by coverage constrained UEs; and the causing the second SIB to be broadcast includes repeating the broadcast of the second SIB a plurality of times for reception by coverage constrained UEs.

17. The control circuitry of clause 16, wherein the control circuitry is arranged to:

generate a third SIB, the third SIB for reception by UEs that are not coverage constrained; and causing the third SIB to be broadcast without repetition.

18. The control circuitry of any one of clauses 14 to 17, wherein the second SIB indicates only the information that has changed.

19. A method of broadcasting system information, the method comprising:

generating a full system information block (SIB);
broadcasting the full SIB to at least one user equipment (UE);
determining updated parameters associated with the full SIB;
generating a differential SIB based on the updated parameters; and
broadcasting the differential SIB to the at least one UE.

20. The method of clause 19, wherein:
broadcasting the full SIB includes repeating the full SIB a number of times, and broadcasting the differential SIB includes repeating the differential SIB a number of times.

21. The method of clause 19 or clause 20, further comprising:

broadcasting full SIBs with a first periodicity; and
broadcasting differential SIBs with a second periodicity, wherein a period of the second periodicity is shorter than the first periodicity.

22. The method of clause 21, wherein the first periodicity is greater than 30 minutes, or wherein the first periodicity is greater than 1 hour.

23. A user equipment, UE, comprising:
means for receiving a full System Information Block (SIB) indicative of a plurality of parameter values;
means for setting parameters in the UE based on the plurality of parameter values;
means for receiving a differential SIB indicative of parameter values that have changed since a previously received SIB; and
means for updating at least one of the parameter values that have changed, based on the received differential SIB.

24. An evolved Node B, eNB, comprising:
means for generating a full system information block (SIB);
means for broadcasting the full SIB to at least one user equipment (UE);
means for determining updated parameters associated with the full SIB;
means for generating a differential SIB based on the updated parameters; and
means for broadcasting the differential SIB to the at least one UE.

25. A non-transitory machine-readable storage medium having stored thereon instructions that, when executed by a computer, cause the computer to perform the method of any one of clauses 9-13 or 19-22 or operate as the apparatus of any one of clauses 1 to 8, 15-18, 23 or 24.

26. A computer program that when executed by a computer causes the computer system to perform the method of any one of 9-13 or 19-22 or to perform as the apparatus of any one of clauses 1 to 8, 15-18, 23 or 24.

27. A User Equipment, UE, substantially as described herein with reference to the drawings.

28. An evolved Node B, eNB, substantially as described herein with reference to the drawings.

29. A method substantially as described herein with reference to the drawings.

Unless contrary to physical possibility, the inventors envision the methods described herein: (i) may be performed in any sequence and/or in any combination; and (ii) the components of respective embodiments may be combined in any manner.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. An apparatus for use in a user equipment (UE), the apparatus comprising:

receive circuitry to receive, from an evolved Node B (eNB), a full System Information Block (SIB) broadcasted periodically with a first period, an indication of a time interval at which two full SIBs are to be transmitted by the eNB, and a plurality of differential SIBs broadcasted periodically with a second period, wherein at least two differential SIBs of the plurality of differential SIBs are to be received within the time interval between receipt of the two full SIBs; and control circuitry, coupled with the receive circuitry, to detect the two full SIBs based on the indicated time interval, to set parameters associated with communication by the UE with the eNB based on the full SIB and to update at least one of the parameters based on a differential SIB of the plurality of differential SIBs.

2. The apparatus of claim 1, wherein the receive circuitry is to receive a System Information (SI) message that includes an indication of the differential SIB, and further wherein the control circuitry is to detect the differential SIB based on the indication.

3. The apparatus of claim 1, wherein the full a SIB includes an indication of the differential SIB.

4. The apparatus of claim 1, wherein the first period is determined by latency tolerance of the UE.

5. The apparatus of claim 1, wherein the first period is a predetermined interval known to the UE.

6. The apparatus of claim 1, wherein the UE is associated with at least one of constrained coverage or low-cost machine-type communication.

7. A user equipment comprising the control circuitry of claim 1, and further comprising one or more of: a display, a touch screen display, a speaker, a physical keyboard, a keypad, a non-volatile memory port, a universal serial bus (USB) port, or an audio jack.

8. A method of updating parameters in a user equipment (UE), the method comprising:

receiving, from an evolved Node B (eNB), a full System Information Block (SIB) broadcasted periodically with a first period, and an indication of a time interval at which two full SIBs are to be transmitted by the eNB;

receiving a plurality of differential SIBs broadcasted periodically with a second period, wherein at least two differential SIBs of the plurality of differential SIBs are to be received within the time interval between receipt of the two full SIBs, and a differential SIB of the plurality of differential SIBs is indicative of parameter values that have changed since a previous SIB; and updating at least one of the parameter values that have changed, based on the differential SIB.

9. The method of claim 8, wherein the previous SIB is a full SIB, the method further comprising:

determining, prior to receiving the full SIB, a timing of the full SIB, the determining including one of:

using pre-defined timing information known to the UE, or received in a SIB 1 broadcast.

10. The method of claim 8, wherein the previous SIB is a differential SIB.

11. The method of claim 8, further comprising:

receiving a SIB 1 broadcast prior to receiving the differential SIB, determining, based on information in the SIB 1 broadcast, whether or not any parameter values have changed since the previous SIB, and performing the receiving the differential SIB and updating at least one parameter in response to a determination that at least one parameter has changed since the previous SIB.

12. The method of claim 11, wherein the SIB 1 broadcast indicates a most recent SIB having changed information, and the determining includes determining whether the previous SIB is more recent than the most recent SIB having changed information.

13. Control circuitry for use in an evolved Node B (eNB), the control circuitry arranged to:

generate periodically with a first period, a first System Information Block (SIB) including system information;

determine periodically with a second period within a time interval between generating two first SIBs information that has changed since the generating of the first SIB; and generate periodically with the second period, a plurality of differential SIBs based on the determination, the plurality of differential SIBs indicating the information that has changed and excluding at least some information that has not changed relative to the first SIB, wherein at least two differential SIBs of the plurality of differential SIBs are to be generated within the time interval between generating two first SIBs.

14. The control circuitry of claim 13, further arranged to:

cause the first SIB to be broadcast; and cause the plurality of differential SIBs to be broadcasted subsequent to the broadcast of the first SIB.

15. The control circuitry of claim 14, wherein:

the causing the first SIB to be broadcasted includes repeating the broadcast of the first SIB a plurality of times for reception by coverage constrained UEs; and the causing the plurality of differential SIBs to be broadcasted includes repeating the broadcast of the plurality of differential SIBs a plurality of times for reception by coverage constrained UEs.

16. The control circuitry of claim 15, wherein the control circuitry is arranged to:

generate a third SIB, the third SIB for reception by UEs that are not coverage constrained; and causing the third SIB to be broadcasted without repetition.

17. The control circuitry of claim 13, wherein the plurality of differential SIBs indicate only information that has changed.

18. A non-transitory machine-readable storage medium having stored thereon instructions that, when executed by a computer, cause the computer to perform the method of claim 8.

19. A non-transitory machine-readable storage medium having stored thereon instructions that, when executed by a computer, cause the computer to operate as the control circuitry of claim 13.

* * * * *